US012602403B2

(12) United States Patent
Wald

(10) Patent No.: US 12,602,403 B2
(45) Date of Patent: Apr. 14, 2026

(54) SCALABLE PARALLEL CONSTRUCTION OF BOUNDING VOLUME HIERARCHIES

(71) Applicant: NVIDIA CORPORATION, Santa Clara, CA (US)

(72) Inventor: Ingo Wald, Salt Lake City, UT (US)

(73) Assignee: NVIDIA CORPORATION, Santa Clara, CA (US)

( * ) Notice: Subject to any disclaimer, the term of this patent is extended or adjusted under 35 U.S.C. 154(b) by 43 days.

(21) Appl. No.: 17/669,293

(22) Filed: Feb. 10, 2022

(65) Prior Publication Data

US 2023/0118972 A1 Apr. 20, 2023

Related U.S. Application Data

(60) Provisional application No. 63/256,897, filed on Oct. 18, 2021.

(51) Int. Cl.
| | |
|---|---|
| *G06F 7/02* | (2006.01) |
| *G06F 16/00* | (2019.01) |
| *G06F 16/2455* | (2019.01) |
| *G06F 16/27* | (2019.01) |
| *G06T 17/10* | (2006.01) |

(52) U.S. Cl.
CPC ...... *G06F 16/278* (2019.01); *G06F 16/24554* (2019.01); *G06T 17/10* (2013.01); *G06T 2210/12* (2013.01); *G06T 2210/21* (2013.01)

(58) Field of Classification Search
CPC ............ G06F 16/24554; G06F 16/278; G06F 16/2455; G06T 17/10; G06T 2210/12; G06T 2210/21

USPC .......................................... 797/778; 707/778
See application file for complete search history.

(56) References Cited

U.S. PATENT DOCUMENTS

| | | | | |
|---|---|---|---|---|
| 11,158,112 | B1* | 10/2021 | Yeo .......................... | G06T 15/06 |
| 2013/0235049 | A1* | 9/2013 | Karras .................. | G06T 17/005 |
| | | | | 345/505 |
| 2013/0249915 | A1* | 9/2013 | Stich ..................... | G06T 17/005 |
| | | | | 345/426 |
| 2015/0262416 | A1* | 9/2015 | Hecht ..................... | G06T 15/08 |
| | | | | 345/424 |

(Continued)

FOREIGN PATENT DOCUMENTS

| | | | |
|---|---|---|---|
| CN | 113034338 A | | 6/2021 |
| CN | 113034338 B | * | 3/2023 |

OTHER PUBLICATIONS

Wald, Ingo, "On fast Construction of SAH-based Bounding Volume Hierarchies" 2007 IEEE Symposium on Interactive Ray Tracing, Sep. 2007. (Year: 2007).*

(Continued)

*Primary Examiner* — Bruce M Moser
(74) *Attorney, Agent, or Firm* — Artegis Law Group, LLP

(57) ABSTRACT

One embodiment of the present invention sets forth a technique for generating a bounding volume hierarchy. The technique includes determining a first set of objects associated with a first node. The technique also includes generating a first plurality of child nodes that are associated with the first node. The technique further includes for each object included in the first set of objects, storing within the object an identifier for a corresponding child node included in the first plurality of child nodes based on a first set of partitions associated with the first set of objects.

22 Claims, 11 Drawing Sheets

(56)                   References Cited

U.S. PATENT DOCUMENTS

2017/0178387 A1* 6/2017 Woop ...................... G06T 15/08

OTHER PUBLICATIONS

Apetrei, Ciprian, "Fast and Simple Agglomerative LBVH Construction", Computer Graphics and Visual Computing, DOI: 10.2312/cgvc.20141206, 2014, pp. 41-44.

Gu et al., "Efficient BVH Construction Via Approximate Agglomerative Clustering", Proceedings of the 5th High-Performance Graphics Conference, Jul. 2013, pp. 81-88.

Ize et al., "Asynchronous BVH Construction for Ray Tracing Dynamic Scenes on Parallel Multi-Core Architectures", in Proceedings of the 7th Eurographics conference on Parallel Graphics and Visualization, 2007, pp. 101-108.

Karras et al., "Fast Parallel Construction of High-Quality Bounding Volume Hierarchies", in Proceedings of the 5th High-Performance Graphics Conference, 2013, pp. 89-99.

Kensler, Andrew, "Tree Rotations for Improving Bounding Volume Hierarchies", IEEE Symposium on Interactive Ray Tracing, 2008, pp. 73-76.

Lauterbach et al., "Fast BVH Construction on GPUs", Computer Graphics Forum, vol. 28, No. 2, 2009, pp. 375-384.

Pantaleoni et al., "HLBVH: Hierarchical LBVH Construction for Real-Time Ray Tracing of Dynamic Geometry", in Proceedings of the Conference on High Performance Graphics, 2010, pp. 87-95.

Wald et al., "Ray Tracing Deformable Scenes Using Dynamic Bounding Volume Hierarchies", ACM Transactions on Graphics, vol. 26, No. 1, Article 6, Jan. 2007, pp. 1-18.

Waldyz et al., "Balancing Considered Harmful—Faster Photon Mapping using the Voxel Volume Heuristic—", Eurographics 2004, DOI:10.1111/j.1467-8659.2004.00791.x, vol. 23, No. 3, 2004, pp. 595-603.

Meister et al., "A Survey on Bounding Volume Hierarchies for Ray Tracing", Eurographics, DOI: 10.1111/cgf.142662, vol. 40, No. 2, Jun. 4, 2021, pp. 683-712.

International Search Report for Application No. PCT/US2022/078230 dated Feb. 17, 2023.

* cited by examiner

SCALABLE PARALLEL CONSTRUCTION OF BOUNDING VOLUME HIERARCHIES

CROSS-REFERENCE TO RELATED APPLICATIONS

This application claims benefit of United States Provisional Patent Application titled "TECHNIQUES FOR SCALABLE PARALLEL BOUNDING VOLUME HIERARCHY CONSTRUCTION," filed Oct. 18, 2021 and having Ser. No. 63/256,897. The subject matter of this related application is incorporated herein by reference.

BACKGROUND

Field of the Various Embodiments

Embodiments of the present disclosure relate generally to computer science and computer graphics and, more specifically, to scalable parallel construction of bounding volume hierarchies.

DESCRIPTION OF THE RELATED ART

A bounding volume hierarchy (BVH) is a versatile hierarchical data structure that is used to spatially organize points, triangles, polygons, meshes, or other types of objects in a graphics scene or another representation of a space. A BVH typically includes a tree structure with multiple levels of nodes. Each node in the tree structure represents a particular "bounding volume," which is a region of space that encompasses (i.e., bounds) some or all of the objects. The root node in the tree structure represents a single space that encompasses (i.e., bounds) all of the objects, and the child nodes of a given node in the tree structure represent a partitioning of the bounding volume represented by the node into smaller non-overlapping bounding volumes. The leaf nodes in the tree structure thus represent the smallest bounding volumes into which the objects are grouped or organized. Each leaf node additionally stores a set of objects that falls within the corresponding bounding volume.

After a BVH is generated for a given set of objects, the tree structure in the BVH can be used to accelerate various spatial queries related to the objects. These spatial queries can be performed during rendering of a graphics scene that includes the set of objects, a simulation involving the set of objects, and/or other types of processing or analysis related to the objects. For example, the tree structure could be traversed to determine a point or object that is first struck by a light ray during a ray tracing operation. In another example, the bounding volumes represented by nodes in the tree structure could be used to detect collisions between virtual objects in a graphics scene or simulation.

When generating a BVH, the tree structure is commonly built in a top-down manner, starting with the root node and descending down to the leaf nodes. At a given parent node in the tree structure, the bounding volume represented by the parent node is partitioned into two or more disjoint bounding volumes. Two or more nodes representing the disjoint bounding volumes are also created as child nodes of the parent node. The bounding volume represented by the parent node also can be "adaptively" partitioned into the bounding volumes represented by the child nodes in a manner that accounts for the spatial distribution of the objects in the bounding volume. For example, a top-down BVH construction technique could compute a representative point for each object as a centroid of the object and/or a centroid of a bounding box for the object. The top-down BVH construction technique also could determine a bounding box into which the representative points for all objects assigned to the parent node fit. The top-down BVH construction technique could select an axis along which the bounding box is to be partitioned and could choose one or more split planes along the axis that divide the bounding box into two or more bounding volumes associated with the child nodes. Each split plane could be chosen based on the length of the axis, the amount of overlap between the split plane and the objects, a cost associated with traversing the BVH to perform a given task, and/or other heuristics that adapt the partitioning of the bounding volume to various parameters or factors. The top-down BVH construction technique could continue to partition the different nodes in the BVH recursively into additional child nodes until the number of objects associated with a given node falls below a threshold and/or until another condition is met.

One drawback of the adaptive top-down approach described above is that the operations related to this approach are difficult to parallelize. In particular, the number of partitioning operations performed at a given level of the BVH and the computational overhead associated with computing the partitions change over time, thereby making parallelization difficult. More specifically, the top-down approach starts with operations related to generating partitions for a small number of nodes and a large number of objects per node. As the top-down approach progresses, partitioning operations are performed on an increasing number of nodes and a decreasing number of objects per node. Consequently, a large number of threads and/or processors are typically used to partition individual nodes near the root node of the BVH, while single threads are typically used to partition individual nodes near the leaf nodes of the BVH. In between the root node and the leaf nodes, the number of threads and/or processors that operate on a given node usually is varied based on the number nodes at a given level of the BVH and the number of objects associated with the node.

Another drawback of the adaptive top-down approach described above is that each node in the tree structure typically maintains a list of objects grouped under the bounding volume represented by the node. Accordingly, memory has to be allocated for each list, and a list of objects assigned to a given parent node has to be partitioned into sub-lists for the corresponding child nodes. As the BVH is built, the memory allocations have to adapt to changes in both the number of lists (e.g., a small number of lists near the root node and a large number of lists near the leaf nodes) and the size of each list (e.g., large lists near the root node and small lists near the leaf nodes). Further, the partitioning of lists into sub-lists incurs resource overhead that is a function of both the size of a given list and the number of lists to be partitioned at a given level of the tree structure.

As the foregoing illustrates, what is needed in the art are more effective techniques for generating bounding volume hierarchies.

SUMMARY

One embodiment of the present invention sets forth a technique for generating a bounding volume hierarchy (BVH). The technique includes determining a first set of objects associated with a first node. The technique also includes generating a first plurality of child nodes that are associated with the first node. The technique further includes for each object included in the first set of objects, storing within the object an identifier for a corresponding child node included in the first plurality of child nodes based on a first set of partitions associated with the first set of objects.

One technical advantage of the disclosed techniques relative to the prior art is that, with the disclosed techniques, the same kernels are used to process the various nodes and objects within a BVH regardless of the levels at which the nodes and objects reside within the BVH. Accordingly, the disclosed techniques can be implemented more easily relative to conventional approaches that have to adapt the number of threads or processors used to process individual nodes to the number and complexity of partitioning operations being performed at a given level of the BVH. Another technical advantage of the disclosed techniques is that objects are "moved" to different nodes within a BVH by simply changing the node identifiers stored in the objects. Consequently, the disclosed techniques are more computationally efficient than prior art approaches, where individual lists of the different objects assigned to individual nodes in a BVH have to be maintained. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
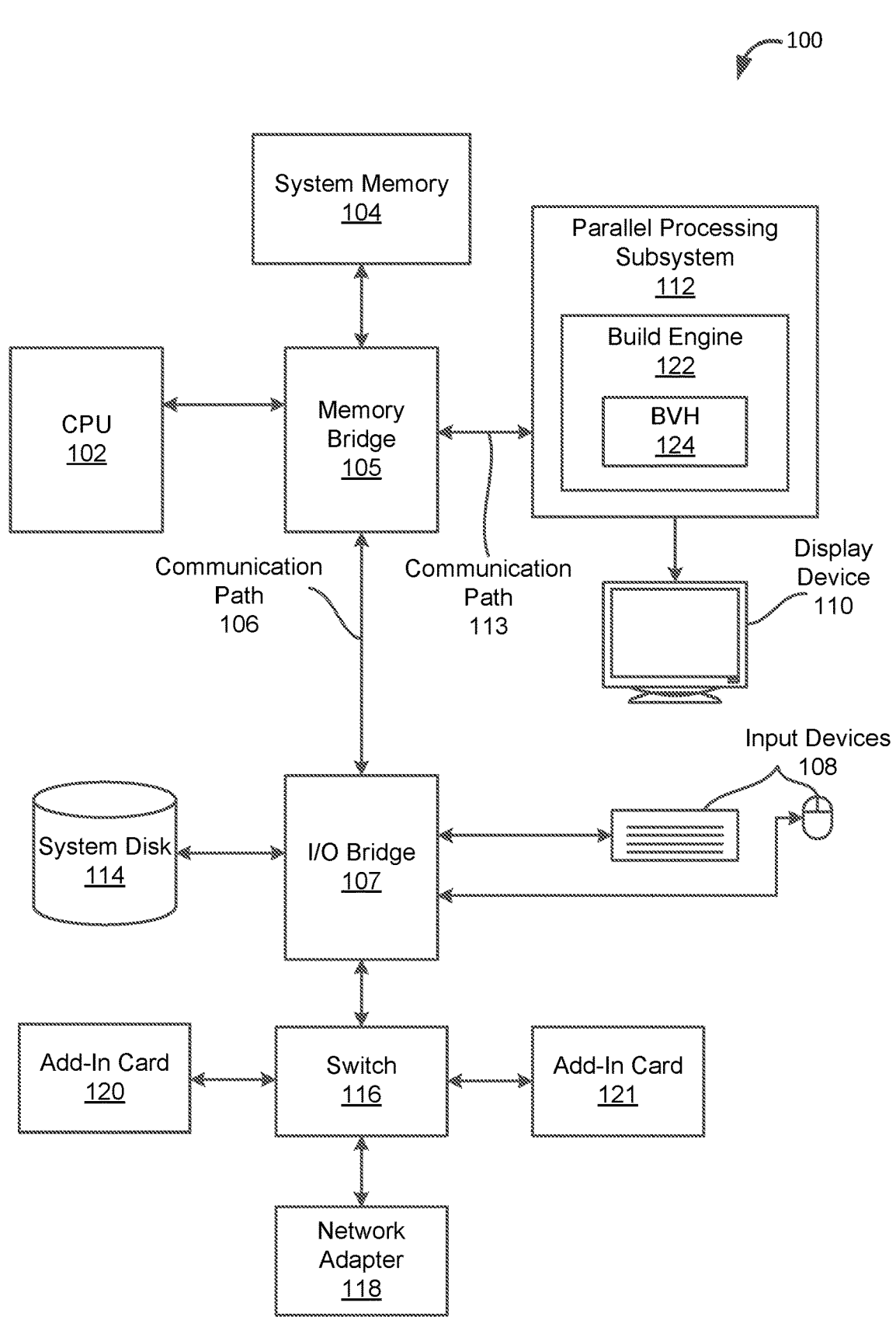
FIG. 1 illustrates a system configured to implement one or more aspects of the various embodiments.

In the following description, numerous specific details are set forth to provide a more thorough understanding of the various embodiments. However, it will be apparent to one of skill in the art that the inventive concepts may be practiced without one or more of these specific details.

GENERAL OVERVIEW

A bounding volume hierarchy (BVH) is a versatile hierarchical data structure that is used to spatially organize points, triangles, polygons, meshes, or other types of objects in a graphics scene or another representation of a space. A BVH typically includes a tree structure with multiple levels of nodes. Each node in the tree structure represents a particular "bounding volume," which is a region of space that encompasses (i.e., bounds) some or all of the objects. The root node in the tree structure represents a single space that encompasses (i.e., bounds) all of the objects, and the child nodes of a given node in the tree structure represent a partitioning of the bounding volume represented by the node into smaller non-overlapping bounding volumes. The leaf nodes in the tree structure thus represent the smallest bounding volumes into which the objects are grouped or organized. Each leaf node additionally stores a set of objects that falls within the corresponding bounding volume.

After a BVH is generated for a given set of objects, the tree structure in the BVH can be used to accelerate various spatial queries related to the objects. These spatial queries can be performed during rendering of a graphics scene that includes the set of objects, a simulation involving the set of objects, and/or other types of processing or analysis related to the objects. For example, the tree structure could be traversed to determine a point or object that is first intersected by a light ray during a ray tracing operation. In another example, the bounding volumes represented by nodes in the tree structure could be used to detect collisions between virtual objects in a graphics scene or simulation.

When generating a BVH, the tree structure is commonly built in a top-down manner, starting with the root node and descending down to the leaf nodes. At a given parent node in the BVH, the bounding volume represented by the parent node is partitioned into two or more disjoint bounding volumes. Two or more nodes representing the disjoint bounding volumes are created as child nodes of the parent node. The bounding volume represented by the parent node also can be "adaptively" partitioned into the bounding volumes represented by the child nodes in a manner that accounts for the spatial distribution of the objects in the bounding volume. For example, a top-down BVH construction technique could compute a representative point for each object as a centroid of the object and/or a centroid of a bounding box for the object. The top-down BVH construction technique also could determine a bounding box into which the representative points for all objects assigned to the parent node fit. The top-down BVH construction technique could select an axis along which the bounding box is to be partitioned and could choose one or more split planes along the axis that divide the bounding box into two or more bounding volumes associated with the child nodes. Each split plane could be chosen based on the length of the axis, the amount of overlap between the split plane and the objects, a cost associated with traversing the BVH to perform a given task, and/or other heuristics that adapt the partitioning of the bounding volume to various parameters or factors. The top-down BVH construction technique could continue to partition the different nodes in the BVH recursively into additional child nodes until the number of objects associated with a given node falls below a threshold and/or until another condition is met.

One drawback of the adaptive top-down approach described above is that the operations related to this approach are difficult to parallelize. In particular, the number of partitioning operations performed at a given level of the BVH and the computational overhead associated with computing the partitions change over time, thereby making parallelization difficult. More specifically, the top-down approach starts with operations related to generating partitions for a small number of nodes and a large number of objects per node. As the top-down approach progresses, partitioning operations are performed on an increasing number of nodes and a decreasing number of objects per node. Consequently, a large number of threads and/or processors are typically used to partition individual nodes near the root node of the BVH, while single threads are typically used to partition individual nodes near the leaf nodes of the BVH. In between the root node and the leaf nodes, the number of threads and/or processors that operate on a given node usually is varied based on the number nodes at a given level of the BVH and the number of objects associated with the node.

Another drawback of the adaptive top-down approach described above is that each node in the tree structure typically maintains a list of objects grouped under the bounding volume represented by the node. Accordingly, memory has to be allocated for each list, and a list of objects assigned to a given parent node has to be partitioned into sub-lists for the corresponding child nodes. As the BVH is built, the memory allocations have to adapt to changes in both the number of lists (e.g., a small number of lists near the root node and a large number of lists near the leaf nodes) and the size of each list (e.g., large lists near the root node and small lists near the leaf nodes). Further, the partitioning of lists into sub-lists incurs resource overhead that is a function of both the size of a given list and the number of lists to be partitioned at a given level of the tree structure.

To improve the efficiency with which BVHes are constructed, each object in a BVH stores an identifier for a node to which the object is currently assigned. The BVH is constructed by iteratively switching between a node update kernel and an object update kernel. The node update kernel processes a set of nodes at a given level of the BVH. For each node at that level, the node update kernel marks the node as a leaf node if the node meets one or more conditions for becoming a leaf node. If the node does not meet the condition(s) for becoming a leaf node, the node update kernel generates one or more partitions that divide a bounding volume represented by the node into two or more new bounding volumes. The node update kernel also generates two or more child nodes to represent the new bounding volumes. After a given iteration of the node update kernel is complete, all nodes from the level processed by the node update kernel have been converted into leaf nodes or inner nodes.

The object update kernel updates the nodes assigned to the objects based on changes made during the node update kernel. In particular, the object update kernel determines whether the node to which an object is assigned (i.e., based on the identifier for the node that is stored in the object) is a leaf node. If the node to which the object is assigned is marked as a leaf node, the object update kernel optionally marks the object as "finished" to allow subsequent iterations of the object update kernel to skip the object. If the node to which the object is assigned is not marked as a leaf node, the object update kernel determines a new bounding volume to which the object belongs and stores the identifier of the child node representing the new bounding volume in the object.

The object is thus "moved" to the child node without allocating or partitioning any lists of objects associated with nodes. After a given iteration of the object update kernel is complete, each object is assigned to either a leaf node or a child node of a node to which the object was previously assigned.

Alternating execution of the node update kernel and object update kernel is repeated until no further nodes are created and all objects have been assigned to leaf nodes. The construction of the BVH is then finalized by creating lists of objects for the leaf nodes and recomputing bounding volumes associated with the nodes, starting with the leaf nodes and propagating upwards until the root node is reached.

Because the BVH is built using two alternating kernels that respectively update the nodes and the objects, each kernel can be executed in parallel without changing the granularity of the parallelism. Further, the objects are "moved" to different nodes by changing the identifiers stored in the objects instead of performing computationally inefficient operations associated with allocating new lists of objects for newly created nodes and sorting the objects into the lists. Consequently, the BVH can be built in a computationally simpler and more efficient manner than conventional approaches that involve changes in the granularity of the parallelism and/or storing lists of objects assigned to different nodes within a BVH.

SYSTEM OVERVIEW

FIG. 1 is a block diagram illustrating a computer system 100 configured to implement one or more aspects of various embodiments. In some embodiments, computer system 100 is a machine or processing node operating in a data center, cluster, or cloud computing environment that provides scalable computing resources (optionally as a service) over a network.

In various embodiments, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In one embodiment, I/O bridge 107 is configured to receive user input information from optional input devices 108, such as a keyboard or a mouse, and forward the input information to CPU 102 for processing via communication path 106 and memory bridge 105. In some embodiments, computer system 100 may be a server machine in a cloud computing environment. In such embodiments, computer system 100 may not have input devices 108. Instead, computer system 100 may receive equivalent input information by receiving commands in the form of messages transmitted over a network and received via the network adapter 118. In one embodiment, switch 116 is configured to provide connections between I/O bridge 107 and other components of the computer system 100, such as a network adapter 118 and various add-in cards 120 and 121.

In one embodiment, I/O bridge 107 is coupled to a system disk 114 that may be configured to store content and applications and data for use by CPU 102 and parallel processing subsystem 112. In one embodiment, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 includes a graphics subsystem that delivers pixels to an optional display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in conjunction with FIG. 2, such circuitry may be incorporated across one or more parallel processing units (PPUs), also referred to herein as parallel processors, included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver configured to manage the processing operations of the one or more PPUs within parallel processing subsystem 112.

In one or more embodiments, parallel processing subsystem 112 includes a build engine 122 that generates a bounding volume hierarchy (BVH) 124 for a set of objects. For example, build engine 122 could build BVH 124 for points, triangles, polygons, meshes, and/or other types of geometric objects. BVH 124 can then be used to efficiently perform operations related to collision detection, ray tracing, and/or other tasks associated with the geometric objects.

In various embodiments, parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

In one embodiment, CPU 102 is the master processor of computer system 100, controlling and coordinating operations of other system components. In one embodiment, CPU 102 issues commands that control the operation of PPUs. In some embodiments, communication path 113 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other embodiments, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
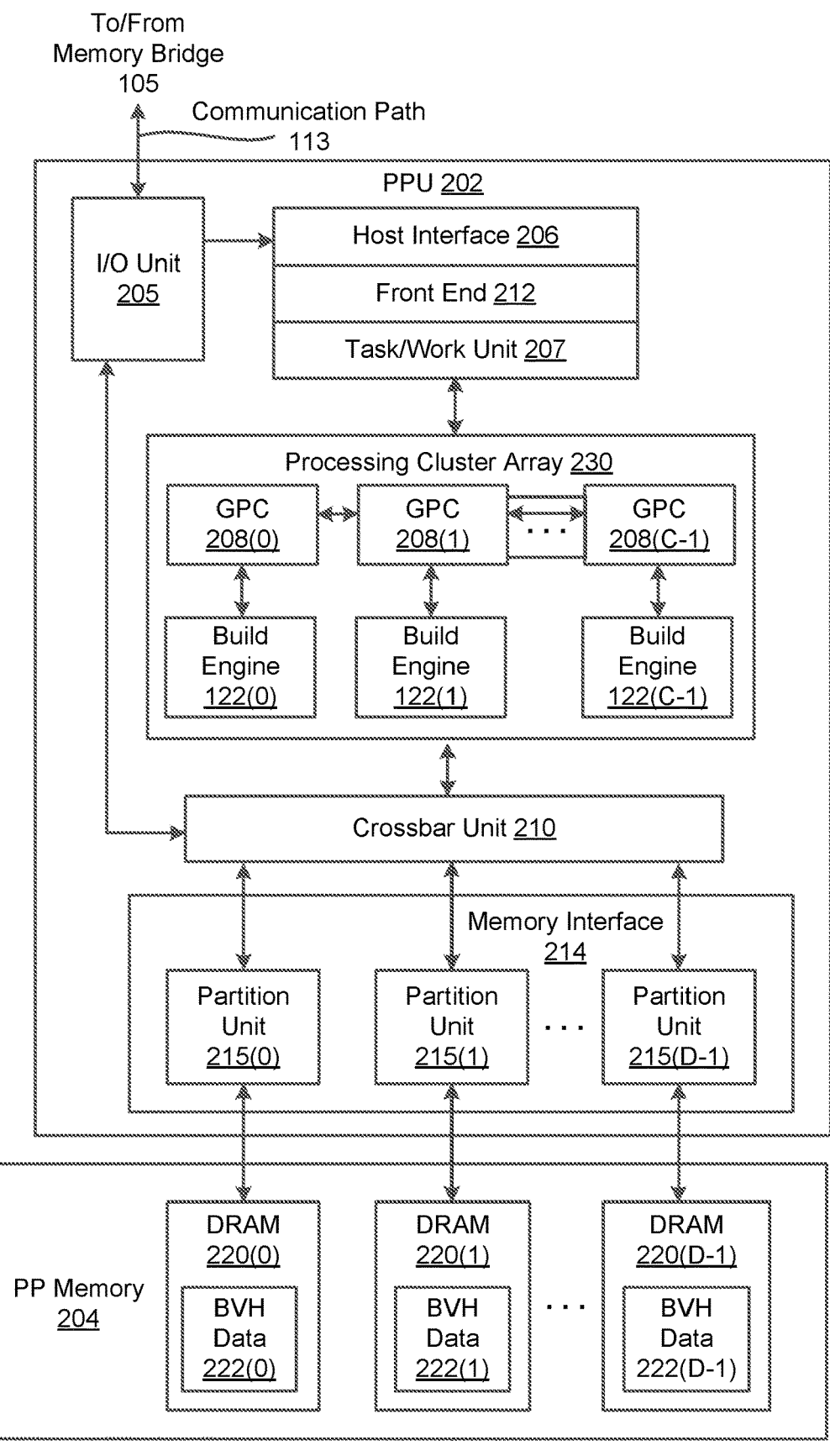
FIG. 2 is a block diagram of a parallel processing unit (PPU) included in the parallel processing subsystem of FIG. 1, according to various embodiments.

FIG. 2 is a block diagram of a parallel processing unit (PPU) 202 included in the parallel processing subsystem 112 of FIG. 1, according to various embodiments. Although FIG. 2 depicts one PPU 202, as indicated above, parallel processing subsystem 112 can include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 includes a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to an optional display device 110 for display. In some embodiments, PPU 202 also may be configured for general-purpose processing and compute operations. In some embodiments, computer system 100 may be a server machine in a cloud computing environment. In such embodiments, computer system 100 may not have a display device 110. Instead, computer system 100 may generate equivalent output information by transmitting commands in the form of messages over a network via the network adapter 118.

As mentioned above, CPU 102 can operate as a master processor that controls and coordinates operations of other system components in computer system 100. In one embodiment, CPU 102 issues commands that control the operation of PPU 202. For example, CPU 102 could write a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a command queue, also referred to herein as a pushbuffer, to initiate processing of the stream of commands in the data structure. In one embodiment, the PPU 202 reads command streams from the command queue and then executes commands asynchronously relative to the operation of CPU 102. In embodiments where multiple pushbuffers are generated, execution priorities may be specified for each pushbuffer by an application program via device driver to control scheduling of the different pushbuffers.

In one embodiment, PPU 202 includes an I/O (input/output) unit 205 that communicates with the rest of computer system 100 via the communication path 113 and memory bridge 105. In one embodiment, I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. In one embodiment, host interface 206 reads each command queue and transmits the command stream stored in the command queue to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In one embodiment, front end 212 transmits processing tasks received from host interface 206 to a work distribution unit (not shown) within task/work unit 207. In one embodiment, the work distribution unit receives pointers to processing tasks that are encoded as task metadata (TMD) and stored in memory. The pointers to TMDs are included in a command stream that is stored as a command queue and received by front end 212 from the host interface 206. Processing tasks that may be encoded as TMDs include indices associated with the data to be processed as well as state parameters and commands that define how the data is to be processed. For example, the state parameters and commands could define the program to be executed on the data. Also for example, the TMD could specify the number and configuration of the set of CTAs. Generally, each TMD corresponds to one task. The task/work unit 207 receives tasks from the front end 212 and ensures that general processing clusters GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

In one embodiment, PPU 202 implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

In one embodiment, memory interface 214 includes a set of D partition units 215, where D≥1. Each partition unit 215 is coupled to one or more dynamic random access memories (DRAMs) 220 residing within PP memory 204. In some embodiments, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

In one embodiment, a given GPC 208 may process data to be written to any of the DRAMs 220 within PP memory 204. In one embodiment, crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In some embodiments, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

In one embodiment, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

In one embodiment, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

As shown, each GPC 208 has access to a corresponding instance of build engine 122, and each DRAM 220 in PP memory 204 stores a partial or complete copy of BVH data 222 that is used to construct BVH 124. For example, each GPC 208 could communicate with a separate accelerator implementing build engine 122 to create and/or update nodes and/or objects in BVH 124. Build engine 122 and BVH data 222 are described in further detail below with respect to FIGS. 3-5.

Those skilled in the art will appreciate that build engine 122, BVH 124, and BVH data 222 can be implemented, replicated, or distributed within the systems of FIGS. 1 and 2 multiple ways. First, one or more portions of BVH 124 and/or BVH data 222 can be stored in on-chip memory (e.g., static random access memory (SRAM), scratchpad memory, an on-chip cache, etc.) for each GPC 208, in lieu of or in addition to storing BVH 124 and/or BVH data 222 on DRAM 220 in PP memory 204. A given GPC 208 or instance of build engine 122 can use direct memory access (DMA) to transfer portions of BVH 124 and/or BVH data 222 between DRAM 220 and the on-chip memory. Second, one or more portions of BVH 124 and/or BVH data 222 can be stored in an L2 cache in each partition unit 215, in lieu of or in addition to being stored on DRAM 220 in PP memory 204. Third, one instance of build engine 122 can be implemented per GPC 208, or one or more instances of build engine 122 can be shared by multiple GPCs 208. Fourth, build engine 122 can be implemented by one or more GPCs 208, one or more CPUs, and/or by a standalone accelerator that processes requests from one or more GPCs 208.

Scalable Parallel Construction of Bounding Volume Hierarchies

Figure 3:
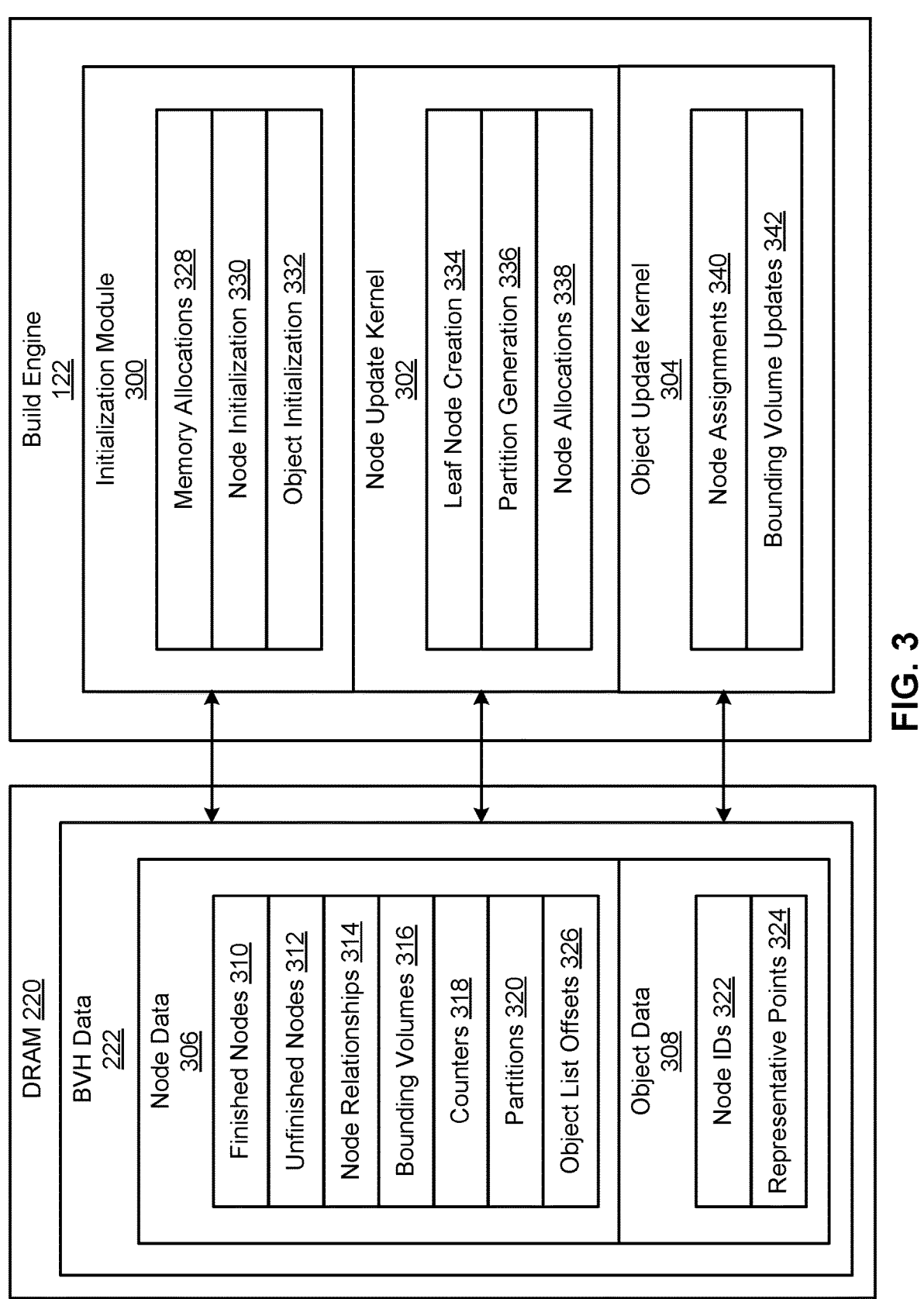
FIG. 3 is a more detailed illustration of the build engine of FIG. 1, according to various embodiments.

FIG. 3 is a more detailed illustration of build engine 122 of FIG. 1, according to various embodiments. As shown in FIG. 3, build engine 122 processes BVH data 222 in DRAM 220 (or another type of memory). BVH data 222 includes node data 306 related to nodes in BVH 124 and object data 308 related to objects in BVH 124. Build engine 122 includes an initialization module 300, a node update kernel 302, and an object update kernel 304. Each of these components is described in further detail below.

Initialization module 300 performs a number of initialization operations related to building BVH 124. These initialization operations include memory allocations 328 for nodes, objects, and/or metadata related to the creation of BVH 124. For example, initialization module 300 could allocate memory for storing node data 306 associated with up to 2N nodes (assuming N objects, where N is an integer greater than 1).

In some embodiments, node data 306 includes node relationships 314 between pairs of nodes in BVH 124. For example, node relationships 314 for a given node could include offsets to the children of the node and/or the parent of the node. Node data 306 can also include bounding volumes 316 represented by the nodes, as well as partitions 320 that are used to divide the bounding volume represented by the node into smaller bounding volumes represented by child nodes of the node. Further, node data 306 can include object list offsets 326 representing the locations of lists of objects assigned to individual leaf nodes in BVH 124. Finally, node data 306 can include one or more bits, tags, and/or other indicators of finished nodes 310 that no longer have to be processed and unfinished nodes 310 that are yet to be processed. These elements of node data 306 are described in further detail below.

In some embodiments, node data 306 includes one or more counters 318 that track the overall number of nodes and/or objects in BVH 124. Counters 318 can include one atomic counter that tracks the number of nodes that have been created and another atomic counter that tracks the total number of objects that have been assigned to leaf nodes in BVH 124. Counters 318 can also include an "object counter"

for each node in BVH 124 that tracks the number of objects currently assigned to the node.

After memory allocations 328 are performed, initialization module 300 performs a node initialization 330 that creates and initializes a root node in BVH 124. For example, initialization module 300 could create the root node within memory allocated in DRAM 220, set the counter that tracks the number of nodes that have been created to 1, set the bounding volume for the root node to an empty box, and set the object counter for the root node to 0.

Initialization module 300 also updates a set of finished nodes 310 and a set of unfinished nodes 312 with the newly created root node. In one or more embodiments, finished nodes 310 include inner nodes with associated child nodes, leaf nodes, or other types of nodes that have been "processed" based on assignments of objects to those nodes. Conversely, unfinished nodes 312 include nodes that have not yet been processed based on assignments of objects to those nodes, such as (but not limited to) nodes that do not have child nodes and that are not leaf nodes. Thus, after creating the root node, initialization module 300 could add the root node to the set of unfinished nodes 312 and initialize the set of finished nodes 310 to an empty set.

Initialization module 300 also performs an object initialization 332 that initializes object data 308 for the objects. During object initialization 332, initialization module 300 allocates an array (or another type of structure) that stores node identifiers (IDs) 332 for the objects. For example, the array could be allocated to have N elements representing N objects. Each element in the array could represent a different object and store an integer corresponding to the node identifier for the node to which the object is assigned. After the array is created, initialization module 300 updates the array so that all elements of the array store the node identifier for the root node (e.g., 0), thereby indicating that all objects are currently assigned to the root node.

During object initialization, initialization module 300 also computes representative points 324 for the objects. For example, initialization module 300 could compute a representative point for each object as the centroid of the object, the centroid of a bounding box for the object, and/or another point that represents the location of the object.

After a representative point is computed for a given object, initialization module 300 performs additional node initialization 330 operations related to the root node. First, initialization module 300 increments the counter at the root node that tracks the number of objects assigned to the root node. Second, initialization module 300 updates the bounding volume associated with the root node so that the representative point is bounded by the bounding volume.

After initialization module 300 has completed memory allocations 328, node initialization 330, and object initialization 332, the root node includes information required to select one or more partitions 320 (e.g., split planes), and every object is "tagged" as belonging to the root node. Build engine 122 then alternates between executing node update kernel 302 and object update kernel 304 to construct the remainder of BVH 124 in a top-down fashion.

More specifically, build engine 122 begins with executing node update kernel 302 after initialization module 300 has finished executing. Each iteration of node update kernel 302 processes nodes at a given level of BVH 124. After a given iteration of node update kernel 302 has completed, build engine 122 executes a corresponding iteration of object update kernel 304 to process the objects based on the results of the previously completed iteration of node update kernel 302.

In one or more embodiments, each iteration of node update kernel 302 processes a set of unfinished nodes 312 representing nodes at a corresponding level of BVH 124. In other words, the first iteration of node update kernel 302 processes the root node at the first (i.e., highest) level of BVH 124, and the $X^{th}$ iteration of node update kernel 302 processes the $X^{th}$ level of nodes in BVH 124.

During processing of a given set of unfinished nodes 312, node update kernel 302 performs leaf node creation 334 that marks a given node as a leaf node after verifying that the node meets one or more criteria for becoming a leaf node. For example, node update kernel 302 could determine the number of objects assigned to the node (e.g., based on node identifiers stored in the objects) and compare this number to a threshold. If the number of objects assigned to the node meets or falls below the threshold, node update kernel 302 could mark the node as a leaf node by storing a split plane with a negative split dimension in the node, setting a bit or flag indicating that the node is a leaf node, or otherwise storing an indication that the node is a leaf node.

After a node is converted into a leaf node, node update kernel 302 updates one or more counters 318 based on the number of objects assigned to the converted node. As mentioned above, counters 318 include an object counter that stores the number of objects assigned to a given node and an atomic counter that stores the total number of objects that have been assigned to leaf nodes. Node update kernel 302 stores the current value of the atomic counter as an object list offset (e.g., object list offsets 326) to the list of objects assigned to the converted node. Node update kernel 302 then increments the second counter by the value of the object counter for the converted node to generate a new object list offset for the next node to be converted into a leaf node. For example, if the converted node is the first leaf node in BVH 124, the object counter for the converted node could store a positive integer represented by M, and the atomic counter could be set to 0. Node update kernel 302 could set the object list offset for the first leaf node to the value of 0 in the atomic counter. Node update kernel 302 could then increase the atomic counter by the value of M in the first counter. If the next node to be converted into a leaf node has an object counter stores a positive integer represented by O, node update kernel could set the object list offset for the next node to M and subsequently increase the atomic counter to M+O. As described in further detail below, build engine 122 uses these counters 318 to create lists of objects assigned to individual leaf nodes in BVH 124 after the structure of BVH 124 has been determined.

When node update kernel 302 determines that a node does not meet the criteria for becoming a leaf node, node update kernel 302 performs a partition generation 336 that selects one or more partitions 320 used to subdivide a bounding volume represented by the node into two or more smaller bounding volumes. For example, node update kernel 302 could use an adaptive spatial median partitioning technique to identify the longest axis in the bounding volume represented by the node and select a split plane along the identified axis. Node update kernel 302 could store the axis and split plane as a partition (e.g., partitions 320) related to the bounding volume represented by the node.

In another example, node update kernel 302 could use a binned surface area heuristic to determine partitions 320 related to a bounding volume represented by a given node. More specifically, node update kernel 302 could generate X (where X is a positive integer) equally sized "bins" into which the bounding volume is divided. Node update kernel 302 could also create X child nodes of the node and initialize the child nodes by setting the corresponding bounding volumes 316 to empty boxes and setting counters 318 that track the number of objects in each of the child nodes to 0.

In a third example, node update kernel 302 could generate multiple partitions 320 that divide a bounding volume represented by a given node into more than two bounding volumes. First, node update kernel 302 could select a first partition that divides the bounding volume into two bounding volumes. Next, node update kernel 302 could select a second partition that divides the larger of the two bounding volumes into two more bounding volumes. Node update kernel 302 could repeat the process until the desired number of bounding volumes are created.

After a set of partitions 320 is generated for a bounding volume represented by a given node, node update kernel 302 performs node allocations 338 that create two or more child nodes representing the smaller bounding volumes into which the bounding volume is subdivided. For example, node update kernel 302 could allocate the child nodes by atomically increasing one or more counters 318 that track the number of nodes that have been created. Node update kernel 302 could store node relationships 314 in the node and/or child nodes indicating that the node is a parent of the child nodes. Node update kernel 302 could further initialize the child nodes by setting the corresponding bounding volumes 316 to empty boxes and setting counters 318 that track the number of objects in each of the child nodes to 0.

In one or more embodiments, node update kernel 302 includes functionality to manage "degenerative splits," in which all objects assigned to a given node are also assigned to a single child node of that node. These degenerative splits can occur when the objects all have the same representative point, or if computation of partitions 320 involves rounding operations that cause a given partition to correspond to one of the sides of a bounding volume represented by the node. When node update kernel 302 detects such a degenerative split, node update kernel 302 can store one or more values indicating the degenerative split (e.g., a value indicating an invalid split dimension) in one or more partitions 320 related to the node. Node update kernel 302 can also create two or more child nodes of the node and sort the objects into the child nodes in a round robin (or another) fashion. Node update kernel 302 can also repeat this process in subsequent iterations until the number of objects in a given node meets the threshold for converting the node into a leaf node.

Node update kernel 302 continues processing nodes at a given level of BVH 124. For example, each iteration of node update kernel 302 could include multiple threads, processor cores, and/or processors that execute in parallel to perform leaf node creation 334, partition generation 336, and node allocations 338 for a set of unfinished nodes 312 at a corresponding level of BVH 124. After the iteration of node update kernel 302 is complete, each node at that level has been converted into a leaf node or an inner node with two or more children.

Object update kernel 304 begins executing after a corresponding iteration of node update kernel 302 has finished. In particular, a given iteration of object update kernel 304 performs node assignments 340 that reassign some or all objects to nodes that were created in the corresponding iteration of node update kernel 302. During node assignments 340, object update kernel 304 checks the node to which each object is currently assigned. If the node is marked as a leaf node, object update kernel 304 does not reassign the object to another node. Object update kernel 304 also optionally marks the object with a bit, flag, or another indicator that the object does not need to be reassigned. This indicator allows future invocations of object update kernel 304 to skip additional processing related to the object. Object update kernel 304 could also, or instead, maintain a list of objects that still need to be reassigned and remove objects from the list as the objects are assigned to leaf nodes.

If the node to which a given object is not marked as a leaf node, object update kernel 304 reassigns the object to a child node of the node based on one or more partitions 320 stored in the node. For example, object update kernel 304 could retrieve a split plane from the node and compute the side of the split plane on which the representative point in the object falls. Object update kernel 304 could then update the node ID (e.g., node IDs 322) stored in the object to that of the corresponding child node, thereby "moving" the object to the child node.

After node assignments 340 are performed for one or more objects, object update kernel 304 increments one or more corresponding counters 318 that track the number of objects assigned to each of the child nodes. For example, object update kernel 304 could increment a counter that represents the number of objects assigned to a given child node after an object is reassigned to the child node.

Object update kernel 304 also performs bounding volume updates 342 that update bounding volumes 316 represented by the child nodes to include representative points in the objects assigned to the child nodes. For example, object update kernel 304 could determine that an object assigned to a child node has a representative point that lies outside the current bounding volume represented by the child node. Object update kernel 304 could then update the bounding volume to include one or more dimensions of the representative point that previously fell outside the bounding volume.

As with node update kernel 302, each iteration of object update kernel 304 can be executed in parallel by multiple threads, processors, and/or processor cores. Each of these threads, processors, and/or processor cores can perform node assignments 340 and bounding volume updates 342 for a different subset of objects.

After a given iteration of object update kernel 304 has processed all objects, build engine 122 moves the nodes processed by the corresponding iteration of node update kernel 302 (i.e., the nodes that were recently converted to leaf nodes or inner nodes by node update kernel 302) from the set of unfinished nodes 312 to the set of finished nodes 310. Build engine 122 also adds the child nodes created by the corresponding iteration of node update kernel 302 (i.e., the nodes to which the objects are reassigned by the current iteration of object update kernel 304) to the set of unfinished nodes 312.

Build engine 122 continues alternating between node update kernel 302 and object update kernel 304 until no further nodes are created. At this point, every node is either a leaf node or an inner node, the set of unfinished nodes 312 is empty, and every object has been assigned to a leaf node.

Build engine 122 then finalizes the construction of BVH 124 using BVH data 222. First, build engine 122 creates a list of objects for each leaf node in BVH 124 based on node IDs 322, counters 318, and object list offsets 326 in object data 308. For example, build engine 122 could create a new array of elements to store the lists of objects. For each leaf node, build engine 122 stores a list of objects assigned to the leaf node, starting at the corresponding object list offset. Thus, if the first leaf node has M assigned objects and an object list offset of 0, build engine 122 stores the M objects assigned to the first leaf node in offsets ranging from 0 to M−1. If the second leaf node has O assigned objects and an object list offset of M, build engine 122 stores the O objects assigned to the second leaf node in offsets ranging from M to M+O−1. After build engine 122 has written an object to a corresponding offset within a given list, build engine 122 can increment the object list offset for the corresponding leaf node and write a different object to the incremented offset.

Second, build engine 122 computes final bounding volumes 316 for all of the nodes in BVH 124. For example, build engine 122 could compute the final bounding volumes 316 as bounding boxes for the boundaries of objects in the corresponding leaf nodes. Build engine 122 can also compute the final bounding volumes 316 in a "bottom up" manner that starts with the leaf nodes. In other words, after final bounding volumes 316 are computed for all leaf nodes that are children of a given parent node, build engine 122 combines these final bounding volumes 316 into a final bounding volume for the parent node. Build engine 122 can repeat the process for other nodes in BVH 124 until a final bounding volume is computed for the root node.

In some embodiments, build engine 122 uses the computation of the final bounding volumes 316 to "refit" or "repopulate" nodes in BVH 124 with the corresponding bounding volumes. More specifically, build engine 122 can discard bounding volumes 316 associated with inner nodes after these bounding volumes 316 are used to generate partitions 320 used to create new bounding volumes 316 for child nodes of the inner nodes. This discarded information can be used to reduce memory consumption during the construction of BVH 124. After all objects have been assigned to leaf nodes, build engine 122 recomputes final bounding volumes 316 for the leaf nodes and propagates the final bounding volumes 316 upward until the root node is reached.

Build engine 122 can also, or instead, reduce memory consumption via other techniques. For example, build engine 122 could allocate temporary memory for all node data 306 and object data 308 in a single dynamic memory allocation call. In another example, build engine 122 could separate bounding volumes 316, partitions 320, and/or other split selection information used to select splits in BVH 124 from node relationships 314 and/or other data related to node topology in node data 306. Build engine 122 could also store the split selection information in BVH 124 in at most $N_S$ entries. If there are more than $N_S$ unfinished nodes 312, build engine 122 could split only the first $N_S$ unfinished nodes 312. As a result, build engine 122 would allocate a temporary node array for only the topology information, which is significantly smaller in size than the split selection information.

As mentioned above, each object can include or be associated with a bit, flag, list, or indicator that can be used by object update kernel 304 to skip objects that have already been assigned to leaf nodes. This indicator can also be used by one or more portions of build engine 122 to mark and skip "invalid" objects during construction of BVH 124. For example, initialization module 300 could validate each object during object initialization 332. This validation could include (but is not limited to) verifying that objects representing triangles have three unique vertices and/or verifying that the data representing a given object is not corrupted. When an invalid object is detected (e.g., when an object representing a triangle is actually a line, a point, or corrupted), initialization module 300 could set the indicator for the object and/or remove the object from the list of objects to be reassigned, thereby causing object update kernel 304 to skip the object during construction of BVH 124. Initialization module 300 could also set the node ID of the object to a negative value or some other value indicating that the object should not be assigned to any non-leaf nodes in BVH 124. After all "valid" objects have been assigned to leaf nodes, build engine 122 could optionally add the invalid objects to the corresponding lists of objects assigned to the leaf nodes based on the final bounding volumes 316 associated with the leaf nodes.

In one or more embodiments, build engine 122 reduces collisions among atomic operations that update nodes and/or objects via collaborative updates to the nodes and/or objects by multiple threads. For example, build engine 122 could store node data 306 and/or object data 308 related to up to Y unfinished nodes 312 in local or shared memory within a GPU. Multiple threads executing node update kernel 302 and/or object update kernel 304 (e.g., within a thread block) could collaboratively update this shared memory to prevent atomic collisions associated with reassigning a large number of objects to the same node. After a given iteration of node update kernel 302 or object update kernel 304 is complete, the updated node data 306 and/or object data 308 in the shared memory could be flushed to global memory storing all BVH data 222.

Figure 4A:
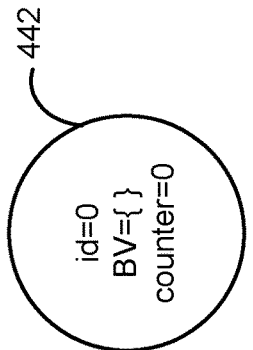
FIG. 4A illustrates a stage in constructing an exemplar bounding volume hierarchy (BVH), according to various embodiments.
Figure 4A:
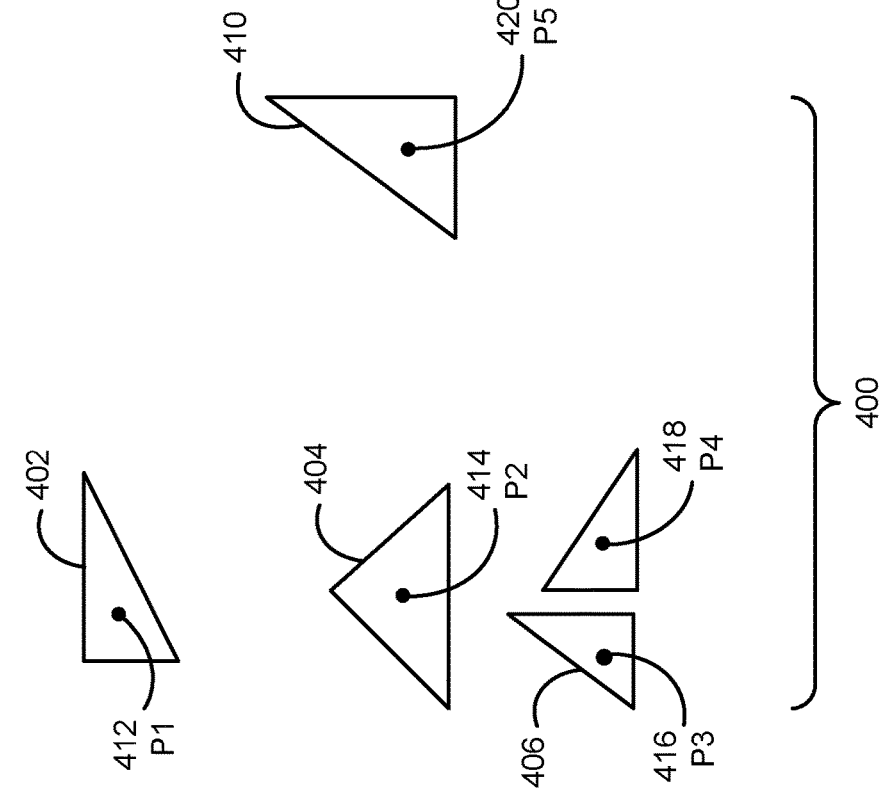

FIG. 4A illustrates a stage in constructing an exemplar BVH 124, according to various embodiments. As shown in FIG. 4A, BVH 124 is constructed for a set of objects 402-410 that occupy a space 400 and a set of representative points 412-420 in the set of objects 402-410. Objects 402-410 include triangles in a two-dimensional (2D) or three-dimensional (3D) space, and representative points 412-420 can include centroids of the triangles and/or centroids of bounding boxes for the triangles. Representative point 412 for object 402 is denoted by P1, representative point 414 for object 404 is denoted by P2, representative point 416 for object 406 is denoted by P3, representative point 418 for object 408 is denoted by P4, and representative point 420 for object 410 is denoted by P5.

FIG. 4A also shows the result of node initialization 330 performed by initialization module 300 based on the set of objects 402-410. This result includes the creation of a root node 442 in BVH 124. The root node 442 includes a node ID of 0, a bounding volume that is set to an empty box, and an object counter that is set to 0. In response to the creation of the root node 442, initialization module 300 also sets an atomic node counter that tracks the number of nodes to 1.

Figure 4B:
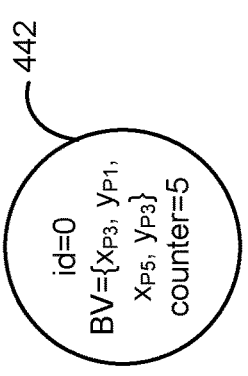
FIG. 4B illustrates another stage in constructing an exemplar BVH, according to various embodiments.
Figure 4B:
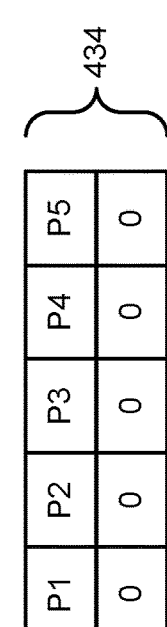
Figure 4B:
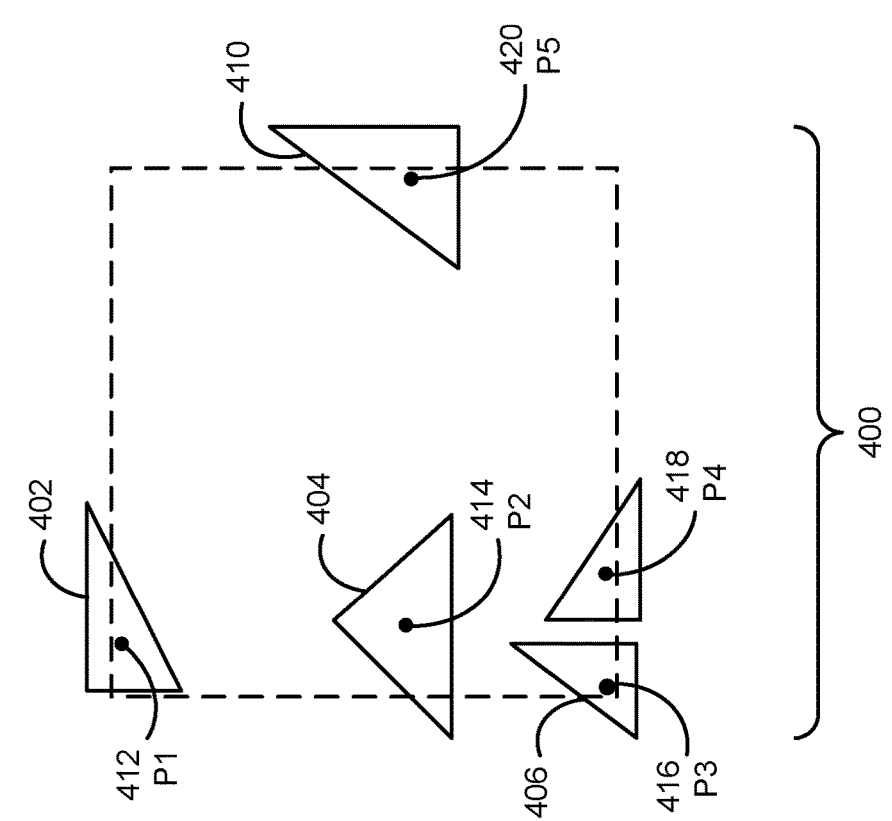

FIG. 4B illustrates another stage in constructing an exemplar BVH, according to various embodiments. More specifically, FIG. 4B shows the result of object initialization 332 performed by initialization module 300 based on objects 402-410.

As shown in FIG. 4B, object initialization 332 includes the creation of an array 434 that stores node IDs 322 for objects 402-410. Each element in array 434 includes a node ID of 0, indicating that all objects 402-410 are currently assigned to the root node 442.

Because all objects 402-410 have been assigned to the root node 442, the root node 442 is updated to include a bounding volume for all representative points 412-420 associated with objects 402-410. The root node 442 is also updated to include an object counter of 5.

Figure 4C:
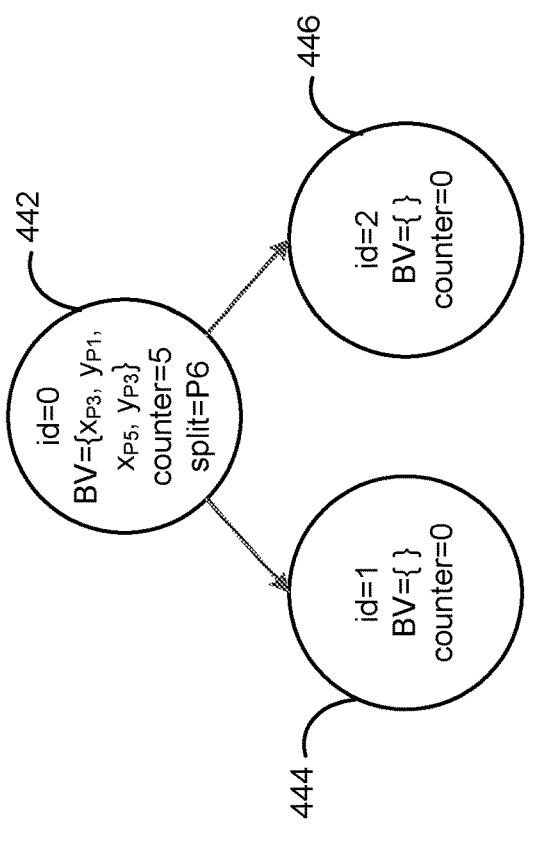
FIG. 4C illustrates another stage in constructing an exemplar BVH, according to various embodiments.
Figure 4C:
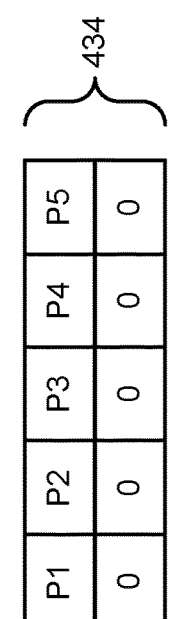
Figure 4C:
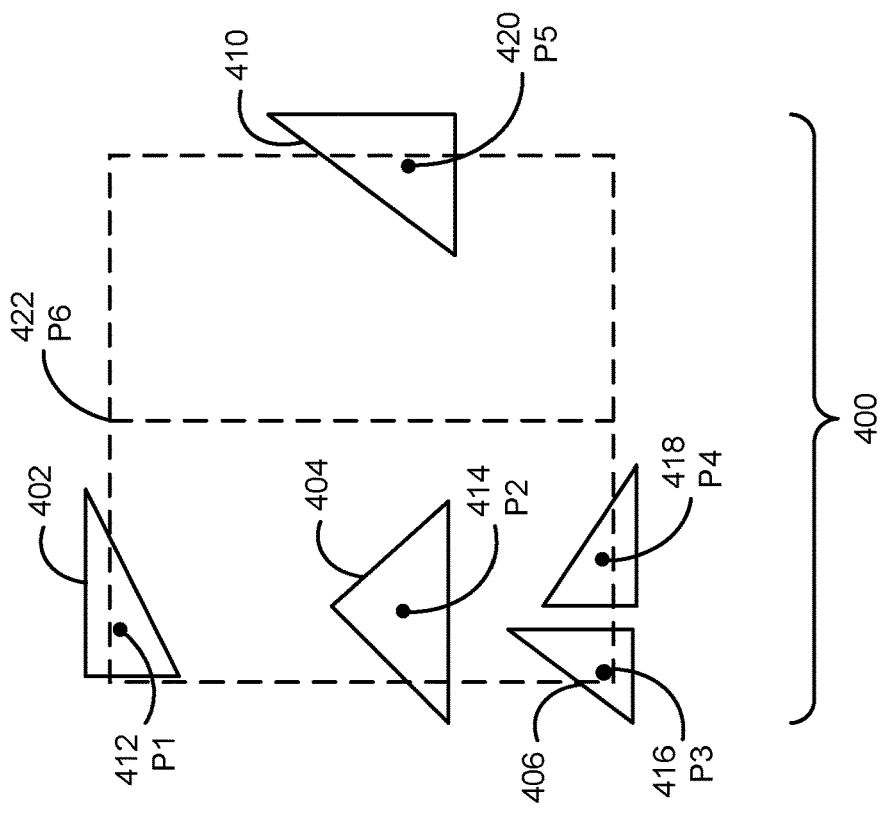

FIG. 4C illustrates another stage in constructing an exemplar BVH, according to various embodiments. As shown in FIG. 4C, BVH data 222 associated with objects 402-410 has been updated by a first iteration of node update kernel 302.

In particular, the first iteration of node update kernel 302 is used to select a split plane for the bounding volume represented by the root node 442. This split plane is represented by a position 422 that is denoted by P6 and located along the longest axis of the bounding volume.

The first iteration of node update kernel 302 is also used to create two child nodes 444-446 of the root node 442. Node 444 has a node ID of 1, a bounding volume set to an empty box, and an object counter that is set to 0. Node 446 has a node ID of 2, a bounding volume set to an empty box, and an object counter that is set to 0. After nodes 444-446 are created, the node counter is incremented to 3.

Figure 4D:
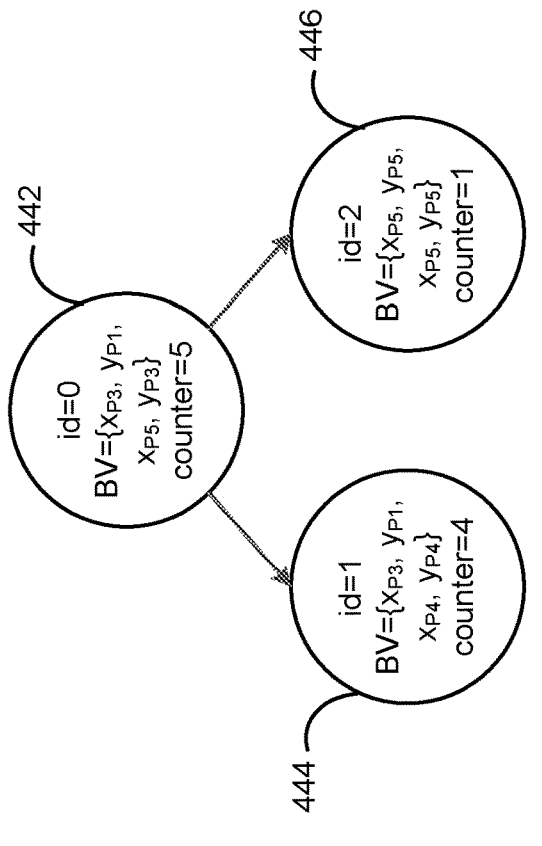
FIG. 4D illustrates another stage in constructing an exemplar BVH, according to various embodiments.
Figure 4D:
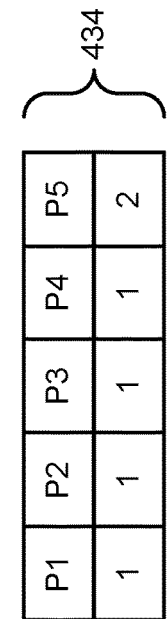

FIG. 4D illustrates another stage in constructing an exemplar BVH, according to various embodiments. As shown in FIG. 4D, BVH data 222 associated with objects 402-410 has been updated by a first iteration of object update kernel 304 following the first iteration of node update kernel 302.

More specifically, the first iteration of object update kernel 304 is used to reassign each of objects 402-410 to one of the two nodes 444-446 created in the first iteration of node update kernel 302. Objects 402-408 are assigned to node 444, which represents the bounding volume to the left of the split plane at position 422. Object 410 is assigned to node 446, which represents the bounding volume to the right of the split plane at position 422.

Nodes 444-446 are also updated to reflect the corresponding assignments of objects 402-410. Node 444 includes a bounding volume that includes representative points 412-418 of objects 402-408 and an object counter of 4. Node 446 includes a bounding volume that includes representative point 420 of object 410 and an object counter of 1.

Figure 4E:
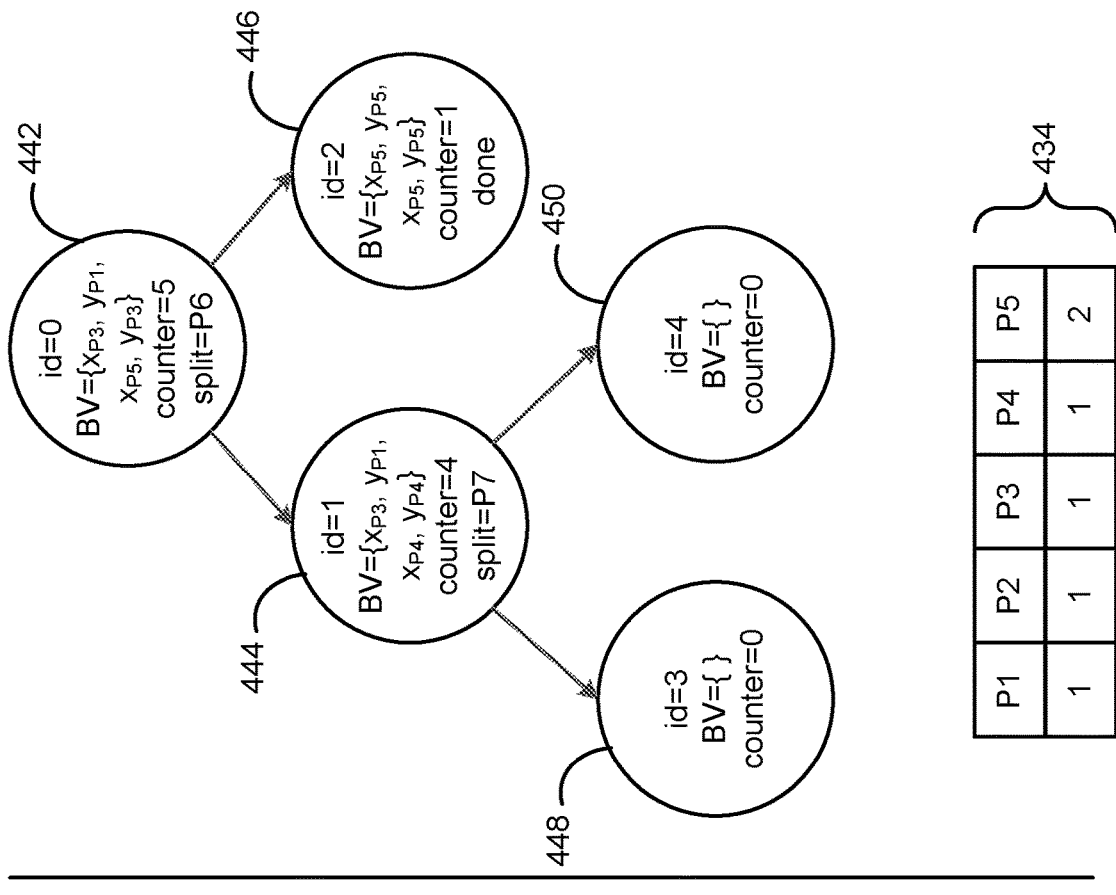
FIG. 4E illustrates another stage in constructing an exemplar BVH, according to various embodiments.
Figure 4E:
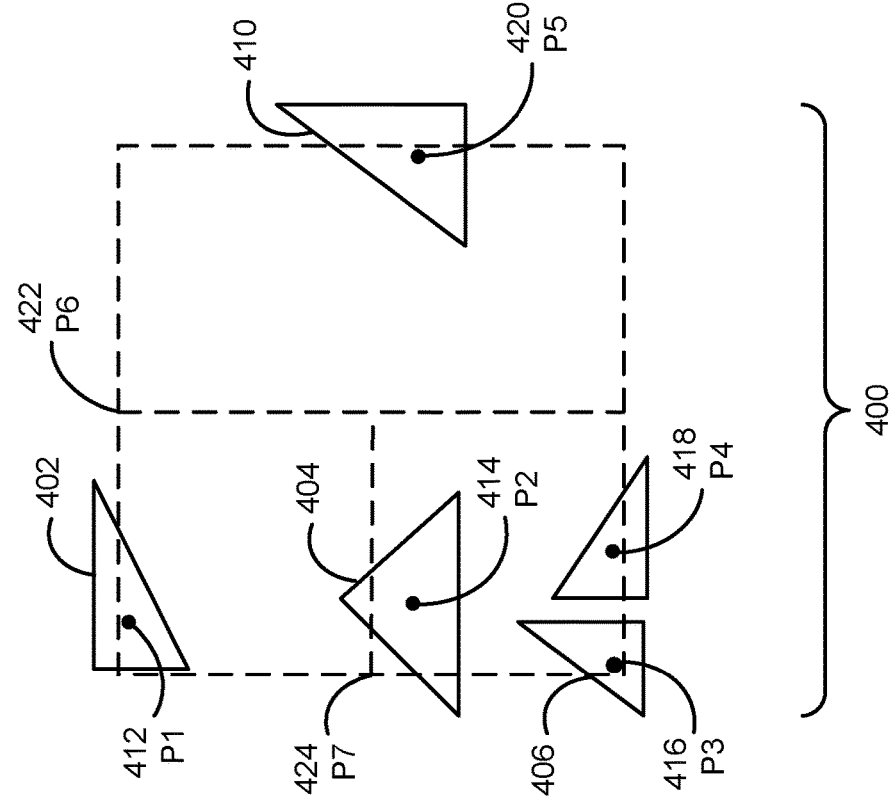

FIG. 4E illustrates another stage in constructing an exemplar BVH, according to various embodiments. In particular, FIG. 4E shows the update of BVH data 222 associated with objects 402-410 by a second iteration of node update kernel 302.

As shown in FIG. 4E, the second iteration of node update kernel 302 is used to convert node 446 into a leaf node (e.g., because the number of objects in node 446 satisfies a threshold for converting a node into a leaf node). In response to the conversion, node 446 includes a bit, flag, or another indicator that the node is "done" and does not need to be split further.

The second iteration of node update kernel 302 is also used to select a split plane for the bounding volume represented by node 444. This split plane is represented by a position 424 that is denoted by P7 and located along the longest axis of the bounding volume represented by node 444.

The second iteration of node update kernel 302 is also used to create two child nodes 448-450 of node 444. Node 448 has a node ID of 3, a bounding volume set to an empty box, and an object counter that is set to 0. Node 450 has a node ID of 4, a bounding volume set to an empty box, and an object counter that is set to 0. After nodes 444-446 are created, the node counter is incremented to 5.

Figure 4F:
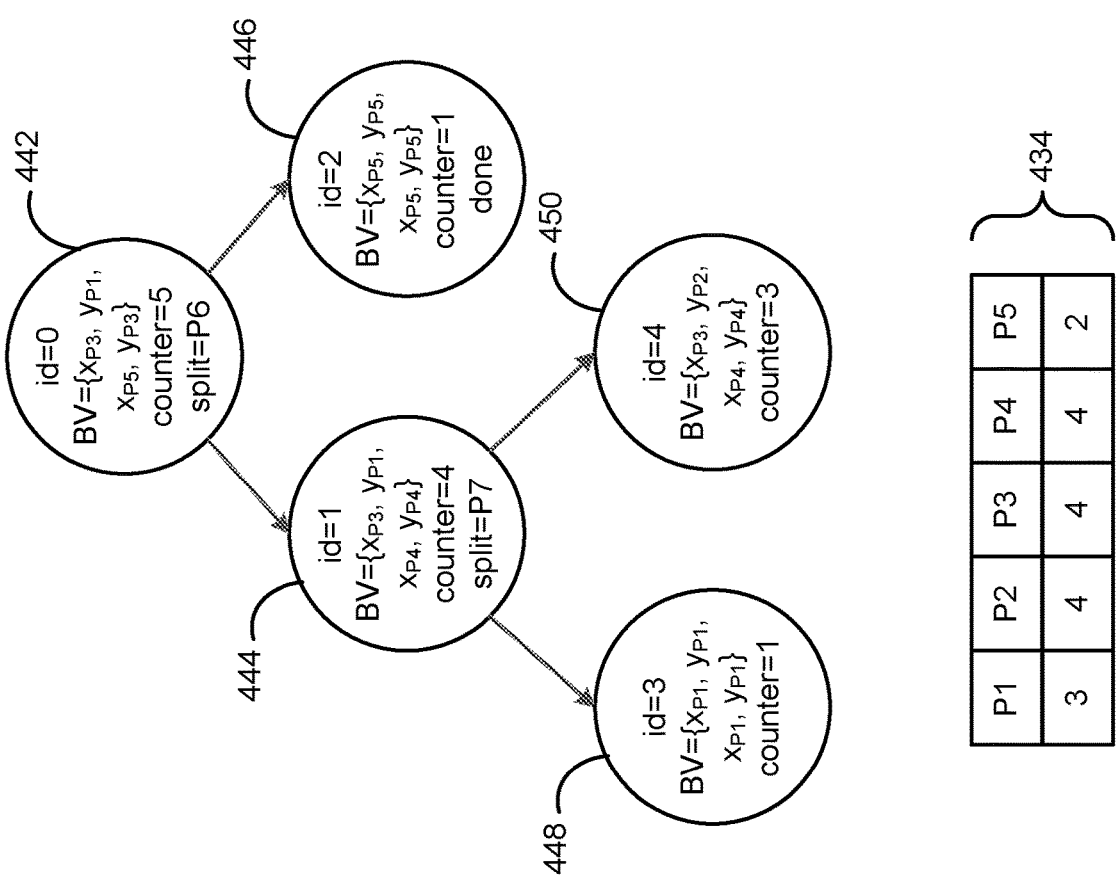
FIG. 4F illustrates another stage in constructing an exemplar BVH, according to various embodiments.
Figure 4F:
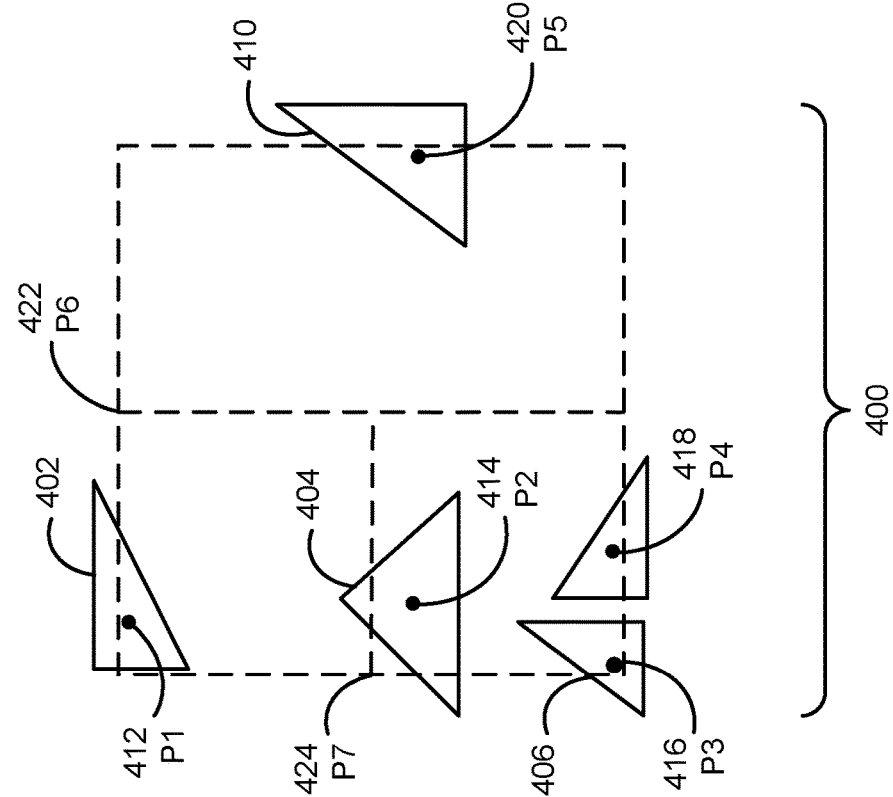

FIG. 4F illustrates another stage in constructing an exemplar BVH, according to various embodiments. In particular, FIG. 4F shows the update of BVH data 222 associated with objects 402-410 by a second iteration of object update kernel 304 following the second iteration of node update kernel 302.

The second iteration of object update kernel 304 is used to reassign each of objects 402-408 to one of the two nodes 448-450 created in the second iteration of node update kernel 302. Object 402 is assigned to node 448, which represents the bounding volume above the split plane at position 424. Objects 404-408 are assigned to node 450, which represents the bounding volume below the split plane at position 424.

Nodes 448-450 are updated to reflect the corresponding assignments of objects 402-408. Node 448 includes a bounding volume that includes representative point 412 of object 402 and an object counter of 1. Node 450 includes a bounding volume that includes representative points 414-418 of objects 404-408 and an object counter of 3.

Figure 4G:
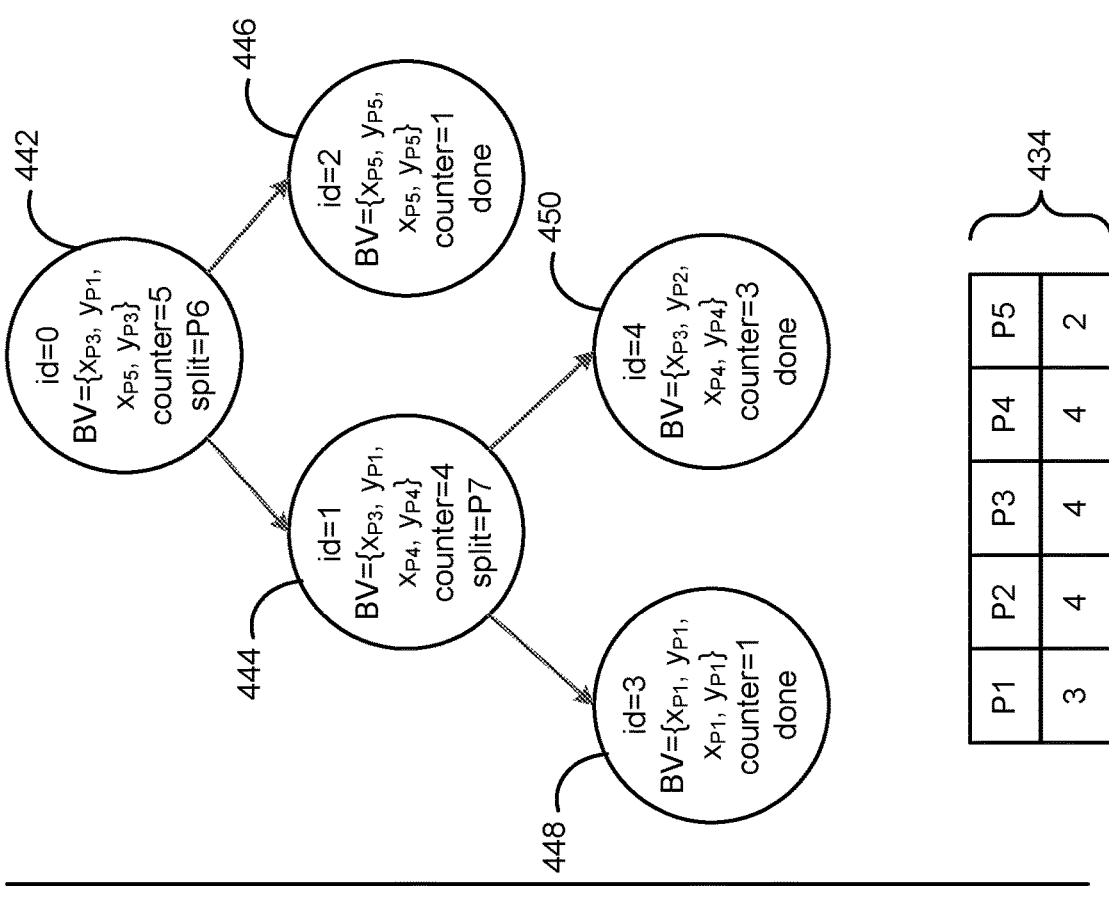
FIG. 4G illustrates another stage in constructing an exemplar BVH, according to various embodiments.

FIG. 4G illustrates another stage in constructing an exemplar BVH, according to various embodiments. More specifically, FIG. 4G shows the update of BVH data 222 associated with objects 402-410 by a third iteration of node update kernel 302.

As shown in FIG. 4G, the third iteration of node update kernel 302 is used to convert nodes 448 and 450 into leaf nodes (e.g., because the object counters in nodes 448 and 450 satisfy a threshold for converting a node into a leaf node). In response to the conversion, each of nodes 448 and 450 includes a bit, flag, or another indicator that the node is "done" and does not need to be split further.

After the third iteration of node update kernel 302 is complete, build engine 122 can determine that all objects 402-410 have been assigned to one of three leaf nodes 446-450. Build engine 122 can then generate a list of objects assigned to each leaf node. For example, build engine 122 could allocate a new array of size 5 to store lists of objects for nodes 446-450. The first list would be created for the first leaf node 446, start at the offset of 0 in the array, and include object 410. The second list would be created for the second leaf node 448, start at the offset of 1 in the array, and include object 402. The third list would be created for the third leaf node 450, start at the offset of 2 in the array, and include objects 404-408.

Figure 5:
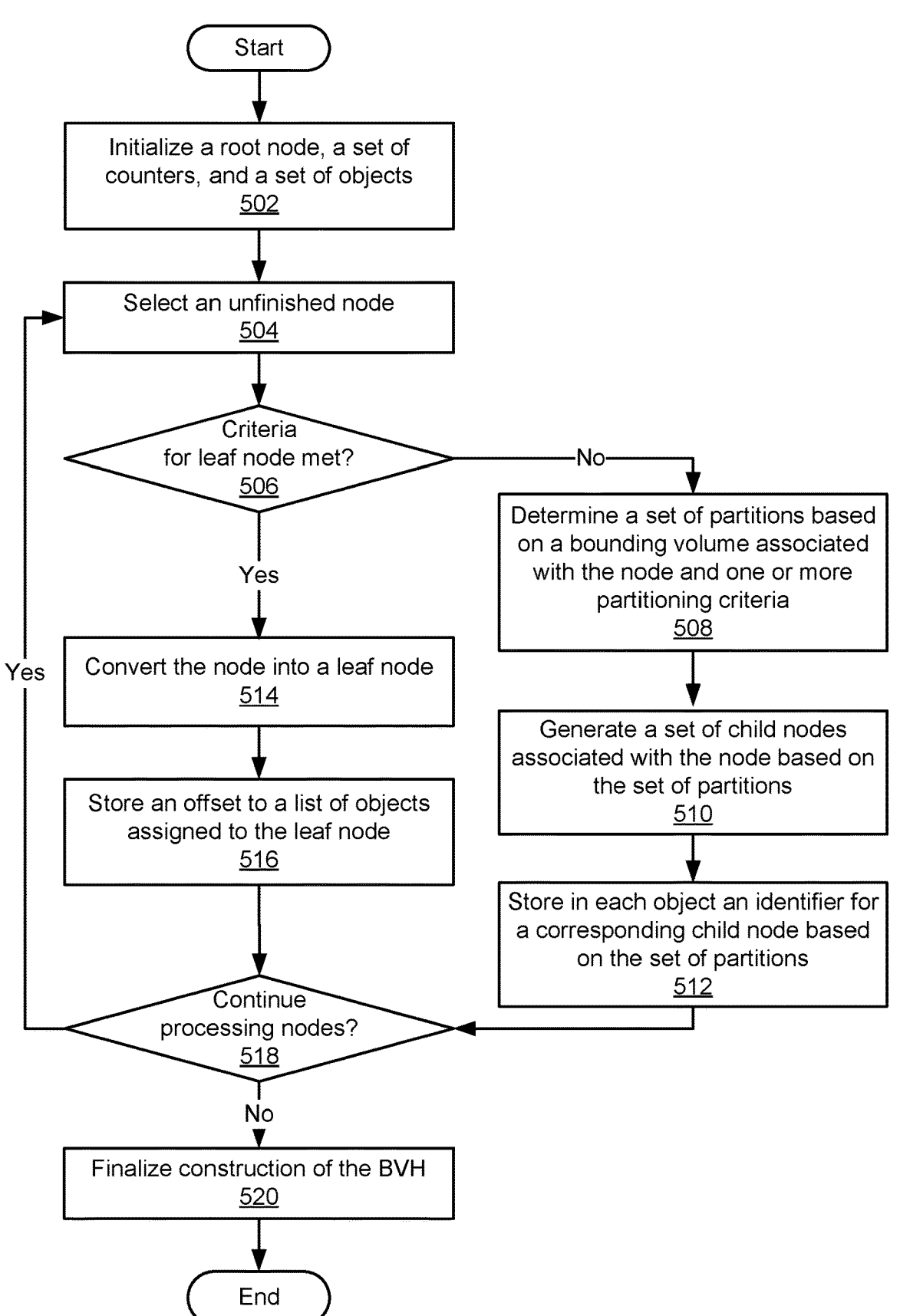
FIG. 5 sets forth a flow diagram of method steps for generating a BVH, according to various embodiments.

FIG. 5 sets forth a flow diagram of method steps for generating a BVH, according to various embodiments. Although the method steps are described in conjunction with the systems of FIGS. 1-3, persons skilled in the art will understand that any system configured to perform the method steps in any order falls within the scope of the present disclosure.

As shown, initialization module 300 initializes 502 a root node, a set of counters, and a set of objects. For example, initialization module 300 could allocate memory to store data related to nodes and/or objects in the BVH. Initialization module 300 could also create the root node, set a bounding volume for the root node to an empty box, and set an object counter for the root node to 0. Initialization module 300 could set a first counter that tracks the number of nodes that have been created to 1 and a second counter that tracks the number of objects that have been assigned to leaf nodes in the BVH to 0. Initialization module 300 could additionally store the node ID of the root node in each object to indicate that the object is assigned to the root node. After a given object is assigned to the root node, initialization module 300 could increment the object counter for the root node and update the bounding volume for the root node to include a representative point in the object.

Next, node update kernel 302 selects 504 an unfinished node. This unfinished node can include a node that has not been split or converted into a leaf node. For example, node update kernel 302 could select the newly created root node after creating the root node in operation 502.

Node update kernel 302 determines 506 if the selected node meets one or more criteria for becoming a leaf node. For example, node update kernel 302 could compare the object counter for the node to a threshold for the maximum number of objects allowed in a leaf node. If the object counter exceeds the threshold, node update kernel 302 could determine that the node does not meet the criteria for becoming a leaf node. If the object counter does not exceed the threshold, node update kernel 302 could determine that the node meets the criteria for becoming a leaf node.

When node update kernel 302 determines that the selected node meets the criteria for becoming a leaf node, node update kernel 302 converts 514 the node into a leaf node. For example, node update kernel 302 could set a bit, flag, or another indicator that marks the node as a leaf node.

Node update kernel 302 also stores 516 an offset to a list of objects assigned to the leaf node. For example, node update kernel 302 could store the offset in a structure representing the leaf node. The offset could be set to the current value of a counter representing the number of objects currently assigned to leaf nodes. After node update kernel 302 stores the offset, node update kernel 302 could increase the counter by the number of objects assigned to the leaf node.

When node update kernel 302 determines that the selected node does not meet the criteria for becoming a leaf node, node update kernel 302 determines 508 a set of partitions based on a bounding volume associated with the node and one or more partitioning criteria. For example, node update kernel 302 could use partitioning criteria associated with an adaptive spatial median partitioning technique, a binned surface area technique, and/or another partitioning technique to determine one or more partitions that subdivide the bounding volume for the selected node into multiple smaller, nonoverlapping bounding volumes.

Node update kernel 302 also generates 510 a set of child nodes associated with the node based on the set of partitions. Continuing with the above example, node update kernel 302 could generate a different child node to represent each of the smaller bounding volumes. After creating each child node, node update kernel 302 could increment the counter tracking the number of nodes that have been created. Node update kernel 302 could also initialize the child node to have a bounding volume that is set to an empty box and an object counter that is set to 0.

Object update kernel 304 then stores 512 in each object an identifier for a corresponding child node based on the set of partitions. For example, object update kernel 304 could use the partitions generated by node update kernel 302 to identify a smaller bounding volume into which a representative point for the object falls. Object update kernel 304 could change the identifier stored in the object to the node identifier for the child node representing the smaller bounding volume. Object update kernel 304 could additionally update the boundaries of the bounding volume stored in the child node to include the location of the representative point for the object.

After processing a given non-leaf node, build engine 122 determines 518 whether or not to continue processing nodes. More specifically, build engine 122 determines that processing of nodes is to continue if additional unfinished nodes remain. Conversely, build engine 122 determines that processing of nodes is to be discontinued if all nodes are either leaf nodes or inner nodes.

When build engine 122 determines that processing of nodes is to continue, build engine 122 repeats operation 504 to select an unfinished node. Build engine 122 also performs operation 506 to determine if the node meets the criteria for becoming a leaf node. If the node meets the criteria for becoming a leaf node, build engine 122 performs operations 514-516 to convert the node into a leaf node. If the node does not meet the criteria for becoming a leaf node build engine 122 performs operations 508-512 to split the node into two or more child nodes and reassign some or all objects to the child nodes. Build engine 122 thus uses operations 504-518 to continue processing nodes until all nodes are either leaf nodes or inner nodes and all objects have been assigned to leaf nodes.

Multiple instances of build engine 122 can also perform operations 504-518 in parallel to build the BVH. For example, multiple threads, thread blocks, processor cores, and/or processor cores could execute build engine 122 to iteratively update different subsets of nodes and objects in the BVH.

After all unfinished nodes have been processed, build engine 122 finalizes 520 construction of the BVH. For example, build engine 122 could generate lists of objects assigned to individual leaf nodes as contiguous offsets into an array, where the offset denoting the start of a list of objects for a given leaf node is stored in the leaf node during creation of the leaf node. Build engine 122 could also perform refitting of bounding volumes represented by the nodes in the BVH (e.g., based on the boundaries of the objects instead of representative points in the objects), starting with the leaf nodes and propagating upwards until the root node is reached.

In sum, the disclosed techniques construct a BVH by alternating between a node update kernel and an object update kernel. The node update kernel performs processing related to nodes in the BVH, and the object update kernel performs processing related to objects organized under the nodes. Each iteration of the node update kernel updates nodes in a given level of the BVH by converting each node into a leaf node or splitting the node into two child nodes. Each iteration of the object update kernel updates objects organized under the nodes by reassigning the objects to child nodes created by the most recent iteration of the node update kernel or marking objects assigned to leaf nodes as no longer needing reassignment. The node update kernel and object update kernel continue executing until all nodes are inner nodes or leaf nodes and all objects have been assigned to leaf nodes.

One technical advantage of the disclosed techniques relative to the prior art is that, with the disclosed techniques, the same kernels are used to process the various nodes and objects within a BVH regardless of the levels at which the nodes and objects reside within the BVH. Accordingly, the disclosed techniques can be implemented more easily relative to conventional approaches that have to adapt the number of threads or processors used to process individual nodes to the number and complexity of partitioning operations being performed at a given level of the BVH. Another technical advantage of the disclosed techniques is that objects are "moved" to different nodes within a BVH by simply changing the node identifiers stored in the objects. Consequently, the disclosed techniques are more computationally efficient than prior art approaches, where individual lists of the different objects assigned to individual nodes in a BVH have to be maintained. These technical advantages provide one or more technological improvements over prior art approaches.

1. In some embodiments, a computer-implemented method for generating a bounding volume hierarchy comprises determining a first set of objects associated with a first node; generating a first plurality of child nodes that are associated with the first node; and for each object included in the first set of objects, storing within the object an identifier for a corresponding child node included in the first plurality of child nodes based on a first set of partitions associated with the first set of objects.

2. The computer-implemented method of clause 1, further comprising determining the first set of partitions based on a first bounding volume associated with the first node and one or more partitioning criteria.

3. The computer-implemented method of any of clauses 1-2, further comprising generating a second set of partitions associated with the first plurality of child nodes; and generating a second plurality of child nodes based on the second set of partitions, wherein each child node included in the second plurality of child nodes is associated with a corresponding parent node that is included in the first plurality of child nodes.

4. The computer-implemented method of any of clauses 1-3, further comprising generating a second plurality of child nodes, wherein each child node included in the second plurality of child nodes is associated with a corresponding parent node that is included in the first plurality of child nodes; generating a first set of bounding volumes for the second plurality of child nodes; and for each parent node included in the first plurality of child nodes, generating a bounding volume for the parent node based on two or more bounding volumes for two or more child nodes of the parent node.

5. The computer-implemented method of any of clauses 1-4, further comprising converting a second node included in the first plurality of child nodes into a leaf node based on one or more leaf node criteria.

6. The computer-implemented method of any of clauses 1-5, wherein the one or more leaf node criteria comprise a threshold for a number of objects assigned to the second node.

7. The computer-implemented method of any of clauses 1-6, further comprising storing a list of objects assigned to a second node included in the first plurality of child nodes based on a first counter that stores a number of objects assigned to the second node and a second counter that stores a total number of objects that have been assigned to leaf nodes.

8. The computer-implemented method of any of clauses 1-7, wherein determining the first set of objects associated with the first node comprises determining that a first identifier for the first node is stored within each object included in the first set of objects.

9. The computer-implemented method of any of clauses 1-8, further comprising executing a plurality of parallel operations to determine the first set of partitions.

10. The computer-implemented method of any of clauses 1-9, wherein the first set of partitions comprises a split plane.

11. In some embodiments, one or more non-transitory computer-readable media store instructions that, when executed by one or more processors, cause the one or more processors to perform the steps of determining a first set of objects associated with a first node; generating a first plurality of child nodes that are associated with the first node; and for each object included in the first set of objects, storing within the object an identifier for a corresponding child node included in the first plurality of child nodes based on a first set of partitions associated with the first set of objects.

12. The one or more non-transitory computer-readable media of clause 11, wherein the instructions further cause the one or more processors to perform the steps of creating the first node as a root node associated with a bounding volume hierarchy; and storing a first identifier for the first node within the first set of objects prior to determining that the first set of objects is associated with the first node.

13. The one or more non-transitory computer-readable media of any of clauses 11-12, wherein the instructions further cause the one or more processors to perform the steps of determining that a first object is invalid; and storing an indicator that the first object should not be assigned to the first node.

14. The one or more non-transitory computer-readable media of any of clauses 11-13, wherein the instructions further cause the one or more processors to perform the steps of executing a plurality of parallel operations to generate a second set of partitions associated with the first plurality of child nodes; and generating a second plurality of child nodes based on the second set of partitions, wherein each child node included in the second plurality of child nodes is associated with a corresponding parent node that is included in the first plurality of child nodes.

15. The one or more non-transitory computer-readable media of any of clauses 11-14, wherein the instructions further cause the one or more processors to perform the step of converting a second node included in the first plurality of child nodes into a leaf node based on one or more leaf node criteria.

16. The one or more non-transitory computer-readable media of any of clauses 11-15, wherein the instructions further cause the one or more processors to perform the steps of determining a second set of objects associated with the second node; and for each object included in the second set of objects, storing an indicator that the object does not need to be reassigned.

17. The one or more non-transitory computer-readable media of any of clauses 11-16, wherein storing within the object the identifier for the corresponding child node comprises determining the corresponding child node based on a representative point for the object and a bounding volume represented by the corresponding child node.

18. The one or more non-transitory computer-readable media of any of clauses 11-17, wherein the instructions further cause the one or more processors to perform the step of executing a plurality of parallel operations to determine the first set of partitions.

19. The one or more non-transitory computer-readable media of any of clauses 11-18, wherein the first set of objects comprises at least one of a point, a line, a triangle, or a polygon.

20. In some embodiments, a system comprises one or more memories that store instructions, and one or more processors that are coupled to the one or more memories and, when executing the instructions, are configured to determine a first set of objects associated with a first node; generate a first plurality of child nodes that are associated with the first node; and for each object included in the first set of objects, store within the object an identifier for a corresponding child node included in the first plurality of child nodes based on a first set of partitions associated with the first set of objects.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a bounding volume hierarchy, the method comprising:

determining a first set of objects represented by a first node of the bounding volume hierarchy, wherein each object included in the first set of objects stores a first identifier for the first node and comprises a graphics element of a graphics scene, wherein the first node represents a first bounding volume;

in response to determining that the first node is not a leaf node of the bounding volume hierarchy, generating a first set of partitions that divides the first bounding volume into a plurality of new bounding volumes;

generating a first plurality of child nodes of the first node for representing the plurality of new bounding volumes;

for a first object included in the first set of objects, changing the first identifier stored within the first object to a second identifier for a corresponding first child node included in the first plurality of child nodes that represents a first new bounding volume in the plurality of new bounding volumes that includes the first object; and performing one or more graphics processing operations based on the second identifier stored within the first object included in the first set of objects.

2. The computer-implemented method of claim 1, further comprising determining the first set of partitions based on one or more partitioning criteria.

3. The computer-implemented method of claim 1, further comprising:

generating a second set of partitions associated with the first plurality of child nodes; and generating a second plurality of child nodes based on the second set of partitions, wherein each child node included in the second plurality of child nodes is associated with a corresponding parent node that is included in the first plurality of child nodes.

4. The computer-implemented method of claim 1, further comprising:

generating a second plurality of child nodes, wherein each child node included in the second plurality of child nodes is associated with a corresponding parent node that is included in the first plurality of child nodes;

generating a first set of bounding volumes for the second plurality of child nodes; and for each parent node included in the first plurality of child nodes, generating a bounding volume for the parent node based on two or more bounding volumes for two or more child nodes of the parent node.

5. The computer-implemented method of claim 1, further comprising converting a second node included in the first plurality of child nodes into a leaf node based on one or more leaf node criteria.

6. The computer-implemented method of claim 5, wherein the one or more leaf node criteria comprise a threshold for a number of objects assigned to the second node.

7. The computer-implemented method of claim 1, further comprising storing a list of objects assigned to a second node included in the first plurality of child nodes based on a first counter that stores a number of objects assigned to the second node and a second counter that stores a total number of objects that have been assigned to leaf nodes.

8. The computer-implemented method of claim 1, wherein determining the first set of objects represented by the first node comprises determining that the first identifier for the first node is stored within each object included in the first set of objects.

9. The computer-implemented method of claim 1, further comprising executing a plurality of parallel operations to determine the first set of partitions.

10. The computer-implemented method of claim 1, wherein the first set of partitions comprises a split plane.

11. The computer-implemented method of claim 1, further comprising, prior to changing the first identifier stored within the first object to the second identifier, reassigning the first object included in the first set of objects from the first node to the first child node.

12. The computer-implemented method of claim 11, wherein the first object included in the first set of objects is reassigned from the first node to the first child node without allocating, storing, or maintaining an object list associated with at least one of the first node or the first child node.

13. One or more non-transitory computer-readable media storing instructions that, when executed by one or more processors, cause the one or more processors to perform the steps of:

determining a first set of objects represented by a first node of a bounding volume hierarchy, wherein each object included in the first set of objects stores a first identifier for the first node and comprises a graphics element of a graphics scene, wherein the first node represents a first bounding volume;

in response to determining that the first node is not a leaf node of the bounding volume hierarchy, generating a first set of partitions that divides the first bounding volume into a plurality of new bounding volumes;

generating a first plurality of child nodes of the first node for representing the plurality of new bounding volumes;

for a first object included in the first set of objects, changing the first identifier stored within the first object to a second identifier for a corresponding first child node included in the first plurality of child nodes that represents a first new bounding volume in the plurality of new bounding volumes that includes the first object; and performing one or more graphics processing operations based on the second identifier stored within the first object included in the first set of objects.

14. The one or more non-transitory computer-readable media of claim 13, wherein the instructions further cause the one or more processors to perform the steps of:

creating the first node as a root node associated with the bounding volume hierarchy; and storing the first identifier for the first node within the first set of objects prior to determining that the first set of objects is associated with the first node.

15. The one or more non-transitory computer-readable media of claim 13, wherein the instructions further cause the one or more processors to perform the steps of:

determining that a second object is invalid; and storing an indicator that the second object should not be assigned to the first node.

16. The one or more non-transitory computer-readable media of claim 13, wherein the instructions further cause the one or more processors to perform the steps of:

executing a plurality of parallel operations to generate a second set of partitions associated with the first plurality of child nodes; and generating a second plurality of child nodes based on the second set of partitions, wherein each child node included in the second plurality of child nodes is associated with a corresponding parent node that is included in the first plurality of child nodes.

17. The one or more non-transitory computer-readable media of claim 13, wherein the instructions further cause the one or more processors to perform the step of converting a second node included in the first plurality of child nodes into a leaf node based on one or more leaf node criteria.

18. The one or more non-transitory computer-readable media of claim 17, wherein the instructions further cause the one or more processors to perform the steps of:

determining a second set of objects associated with the second node; and for each object included in the second set of objects, storing an indicator that the object does not need to be reassigned.

19. The one or more non-transitory computer-readable media of claim 13, wherein storing within the first object the second identifier for the corresponding first child node comprises determining the corresponding first child node based on a representative point for the first object and the first new bounding volume represented by the corresponding first child node.

20. The one or more non-transitory computer-readable media of claim 13, wherein the instructions further cause the one or more processors to perform the step of executing a plurality of parallel operations to determine the first set of partitions.

21. The one or more non-transitory computer-readable media of claim 13, wherein the first set of objects comprises at least one of a point, a line, a triangle, or a polygon.

22. A system, comprising:

one or more memories that store instructions, and one or more processors that are coupled to the one or more memories and, when executing the instructions, are configured to:

determine a first set of objects represented by a first node of the bounding volume hierarchy, wherein each object included in the first set of objects stores a first identifier for the first node and comprises a graphics element of a graphics scene, wherein the first node represents a first bounding volume;

in response to determining that the first node is not a leaf node of the bounding volume hierarchy, generate a first set of partitions that divides the first bounding volume into a plurality of new bounding volumes;

generate a first plurality of child nodes of the first node for representing the plurality of new bounding volumes;

for a first object included in the first set of objects, change the first identifier stored within the first object to a second identifier for a corresponding first child node included in the first plurality of child nodes that represents a first new bounding volume in the plurality of new bounding volumes that includes the first object; and perform one or more graphics processing operations based on the second identifier stored within the first object included in the first set of objects.

* * * * *